(12) United States Patent
Chen et al.

(10) Patent No.: US 7,843,707 B2
(45) Date of Patent: Nov. 30, 2010

(54) NON-CONTACT POWER SUPPLY HAVING BUILT-IN COUPLING DETECTION DEVICE AND COUPLING DETECTION METHOD THEREOF

(75) Inventors: Ching-Piao Chen, Hsinchu (TW);
Wan-Pei Chen, Hsinchu (TW);
Mu-Ping Chen, Hsinchu (TW);
Ming-Che Yang, Hsinchu (TW);
Po-Shen Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 454 days.

(21) Appl. No.: 11/962,038

(22) Filed: Dec. 20, 2007

(65) Prior Publication Data
US 2008/0157909 A1   Jul. 3, 2008

(30) Foreign Application Priority Data
Dec. 27, 2006   (TW)   ............... 95149345 A

(51) Int. Cl.
*H02M 3/335*   (2006.01)
(52) U.S. Cl. .......................................... 363/17; 363/98
(58) Field of Classification Search ............ 363/17, 363/98, 132
See application file for complete search history.

(56) References Cited

U.S. PATENT DOCUMENTS

| 4,797,541 | A | * | 1/1989 | Billings et al. ............... 235/449 |
| 5,293,308 | A | * | 3/1994 | Boys et al. .................... 363/37 |
| 6,515,878 | B1 | * | 2/2003 | Meins et al. .................. 363/37 |
| 6,934,167 | B2 | * | 8/2005 | Jang et al. ................. 363/21.02 |
| 2004/0130915 | A1 | * | 7/2004 | Baarman ................. 363/21.02 |
| 2004/0130916 | A1 | * | 7/2004 | Baarman ................. 363/21.02 |
| 2005/0135129 | A1 | * | 6/2005 | Kazutoshi .................... 363/98 |
| 2006/0239043 | A1 | * | 10/2006 | Ohbo ........................... 363/25 |
| 2009/0003022 | A1 | * | 1/2009 | Nunoya et al. ................. 363/78 |

OTHER PUBLICATIONS

Sakamoto et al.: A Novel Circuit For Non-Contact Charging Through Electro-Magnetic Coupling, IEEE PESC, 1992, pp. 168-174.

* cited by examiner

*Primary Examiner*—Jeffrey L Sterrett

(57) ABSTRACT

The configurations of a non-contact power supply and a coupling detection method thereof are provided. The proposed non-contact power supply includes a detachable transformer including a primary side, a current sensor coupled to the primary side and sensing a primary side current and a controller coupled to the current sensor, receiving the current and determining whether the power supply is under a coupling status according to the current.

23 Claims, 4 Drawing Sheets ns supplies in the prior art are broadly applied to the

NON-CONTACT POWER SUPPLY HAVING BUILT-IN COUPLING DETECTION DEVICE AND COUPLING DETECTION METHOD THEREOF

FIELD OF THE INVENTION

The present invention relates to a non-contact power supply. More particularly, the present invention relates to a non-contact power supply having a built-in coupling detection device and a coupling detection method thereof.

BACKGROUND OF THE INVENTION

Due to that a contact power supply in the prior art requires a plug and a socket to transmit an electric energy via contact connectors, thus it has inherent drawbacks. For example, these contact power supplies generate sparks via contacts (especially when the power is relatively larger) such that there is a danger of getting electric shocked. The metal contacts have relatively lower efficiency caused by wearing away, oxidizing and dusting reasons. Bad contact would also decrease the life-span of the electric apparatuses. Besides, the contact power supplies in the prior art would require the plug to be plugged into the contacts so as to be used, which is quite inconvenient. These problems cause the contact power supplies not applicable to many application occasions/requirements for many electric apparatuses in the areas such as the shafts, the oil drilling platforms, the underwater apparatuses, and the movable apparatuses. On the contrary, the non-contact power supplies, which accomplish the electric energy transmission through the electromagnetic coupling, could avoid all these problems. In this way, no mechanical contact connection is required. Except for the above-mentioned occasions, it could also be applied to the environments of disinfection chambers and hospitals, and the inconveniences caused by plug-in are also avoided. Right now, non-contact power supplies in the prior art are broadly applied to the electric shavers, the electric toothbrushes, the oral Irrigators, the electric cars, the storehouse transportation tools, the railed cranes etc.

Besides, non-contact power supplies are frequently used in providing power to the movable apparatuses. The primary and secondary sides of detachable transformers are used as coupling interfaces, the power are provided when the primary and the secondary sides approach to each other (namely, the power supply apparatus and the movable apparatus approach to each other) to a fixed position, and then the power is provided. Since the electric transmission efficiency is dramatically decreased when the distance between the primary side and the secondary side is relatively too large, therefore, after the primary side and the secondary side of the transformer approach to each other to a fixed distance, then enough electric energy is provided to the movable apparatuses. In such a way, the power supply does not need to provide the power while the movable apparatus has not reached the fixed position yet, which is the best way to save the power, and to test whether the positioning procedure is finished becomes an issue needs to be solved.

As shown in FIG. 1, it is a schematic circuit diagram of a non-contact power supply in the prior art (see H. Sakamoto and K. Harada, "A novel circuit for non-contact charging through electro-magnetic coupling," IEEE PESC, 1992.). In which, the non-contact power supply 1 in the prior art includes an AC power source 10, a first diode D1, a capacitor C1, an inverter 12, a detachable transformer 11 having a primary side 111 and a secondary side 112, a second diode D2 and a load 13. In which, the non-contact part of the non-contact power supply is achieved by the primary side 111 and the secondary side 112 of the transformer 11, and the energy is transmitting by electromagnetic coupling way. In FIG. 1, the primary side 111 of the transformer 11 is coupled to the AC power source (such as a commercial power) 10, and the secondary side 112 of the transformer 11 is for providing the power source, or for charging the power source required by the movable apparatus. In which, the primary side 111 of the transformer 11 is located at the end of the AC power source 10, the secondary side 112 is located on the movable apparatus, and the transformer is a detachable transformer.

In general, the methods for detecting whether the primary side 111 and the secondary side 112 of the transformer 11 have reached the fixed position/are coupled include disposing a limit switch, using infrared/laser apparatuses, or wireless communication apparatuses to detect whether the positioning/coupling procedure is accomplished. That is to say, those methods of detecting positions for the non-contact power supplies 1 in the prior art are dependent on the external detecting/communication apparatuses thus the manufacturing costs of which are relatively higher and the system reliabilities of which are relatively lower due to the relatively more complex system configurations.

For the non-contact power supply disclosed in the present invention, there is not any extra detecting/communication apparatus being added thus no extra cost for the detecting apparatus/communication apparatus is added, only the contents of the built-in program of the controller of the non-contact power supply need to be modified, and the inherent current sensor disposed on the primary side of the transformer is employed to detect a current flowing through the primary side of the transformer so as to determine whether the primary and the secondary sides of the transformer are reaching fixed positions such that power consumptions during the idle time could be saved and the EMI could be decreased.

The power source end could be switched from a detecting mode to a power transmission mode after the current flowing through the primary side of the transformer is employed to detect whether the positioning procedure of the primary and the secondary sides of the transformer of the provided non-contact power supply is accomplished such that not only the unnecessary power consumption before the power is transmitted could be saved but also the EMI during the idle time could also be decreased. In the present invention, the feature that the current at the primary side is relatively smaller when the working frequency of the power source end is at a high frequency and is changed according to the variation of the air gap is employed to detect whether the positioning/coupling procedure of the primary and the secondary sides of the detachable transformer is accomplished.

Keeping the drawbacks of the prior arts in mind, and employing experiments and research full-heartily and persistently, the applicant finally conceived a non-contact power supply having a built-in coupling detection device and a coupling detection method thereof.

SUMMARY OF THE INVENTION

It is therefore an object of the present invention to provide a non-contact power supply having a built-in coupling detection device and a coupling detection method thereof, there is not any extra detecting apparatus/communication apparatus being added to detect/find out whether the positioning/coupling procedure of the primary and the secondary sides of the included detachable transformer is accomplished, only the contents of the built-in program of the controller of the power supply need to be modified, a current flowing through the primary side of the transformer is employed to determine whether the transformer is positioned/coupled, the proposed power supply has the relatively simple configuration, no extra cost for the detecting apparatus/communication apparatus is added, and power consumptions during the idle time could be saved and the EMI could be decreased.

According to the first aspect of the present invention, a non-contact power supply includes a detachable transformer including a primary side and a secondary side, a current sensor coupled to the primary side and sensing a primary side current, a controller generating a switching signal, coupled to the current sensor and including a built-in program for manipulating the power supply and initializing the power supply at a detecting mode, a first rectifying apparatus coupled to an external AC power source in parallel and outputting a first DC voltage, a switch module coupled to the first rectifying apparatus, the primary side and the controller, receiving the first DC voltage and the switching signal and outputting a first AC voltage to the primary side and a second rectifying apparatus coupled to the secondary side, receiving a second AC voltage and generating a second DC voltage.

Preferably, the transformer is under a coupling status when the current is smaller than a first current value, and then the controller makes the power supply switch to a power transmission mode; the transformer is under a separate status when the current is larger than a second current value, and then the controller makes the power supply switch to the detecting mode; the switch module works under a first switching frequency to generate a high level of the first AC voltage, and the switch module works under a second switching frequency to generate a low level of the first AC voltage.

Preferably, the external AC power source is a commercial power and the second switching frequency is higher than the first switching frequency.

Preferably, the switching signal is a low frequency switching signal when the switch module works under the first switching frequency, and the switching signal is one of a high frequency switching signal and a high frequency intermittent switching signal when the switch module works under the second switching frequency.

Preferably, the second current value is larger than the first current value.

Preferably, the power supply further includes a built-in coupling detection device having the current sensor and the controller, wherein the switch module is an inverter.

Preferably, the primary side includes a first terminal and a second terminal, the first rectifying apparatus includes a first output terminal and a second output terminal, and the switch module includes a first power switch having a first terminal coupled to the first output terminal, a second terminal coupled to the second terminal of the primary side and a control terminal, a second power switch having a first terminal coupled to the second terminal of the first power switch, a second terminal coupled to the second output terminal and a control terminal, a third power switch having a first terminal coupled to the first terminal of the first power switch, a second terminal coupled to the first terminal of the primary side and a control terminal and a fourth power switch having a first terminal coupled to the second terminal of the third power switch, a second terminal coupled to the second terminal of the second power switch and a control terminal, wherein the control terminals of the first to the fourth switches are all coupled to the controller for receiving the control signal.

Preferably, the power supply further includes a first and a second capacitors, wherein the first capacitor is coupled to the first terminal of the primary side and the second terminal of the third switch in series, and the second capacitor is coupled to the secondary side in parallel.

Preferably, the first rectifying apparatus further includes a first diode apparatus having at least one first diode and coupled to the external AC power source in parallel, and a third capacitor coupled to the first diode apparatus and the switch module in parallel, the second rectifying apparatus includes a second diode apparatus having at least one second diode and coupled to the secondary side in parallel, and a fourth capacitor coupled to the second diode apparatus and a load in parallel.

Preferably, the power supply further includes a first capacitor, wherein the first capacitor is coupled to the first terminal of the primary side and the second terminal of the third switch in series.

Preferably, the first rectifying apparatus further includes a first diode apparatus having at least one first diode and coupled to the external AC power source in parallel, and a second capacitor coupled to the first diode apparatus and the switch module in parallel, the second rectifying apparatus includes a second diode apparatus having at least one second diode and coupled to the secondary side in parallel, and a third capacitor coupled to the second diode apparatus and a load in parallel.

According to the second aspect of the present invention, a non-contact power supply includes a detachable transformer including a primary side, a current sensor coupled to the primary side and sensing a primary side current and a controller coupled to the current sensor, receiving the current and determining whether the power supply is under a coupling status according to the current.

Preferably, the controller includes a built-in program for manipulating the power supply and initializing the power supply at a detecting mode; the transformer is under a coupling status when the current is smaller than a first current value, and then the controller makes the power supply switch to a power transmission mode; the transformer is under a separate status when the current is larger than a second current value, and then the controller makes the power supply switch to the detecting mode.

Preferably, the transformer further includes a secondary side, the primary side and the secondary side are close to each other within a coupling distance when the power supply is under the coupling status, and the primary side and the secondary side are separate from each other more than a predetermined value when the power supply is under the separate status.

According to the third aspect of the present invention, a coupling detection method for a non-contact power supply, wherein the non-contact power supply includes a detachable transformer having a primary side, a current sensor and a controller, includes the steps of: (a) sensing a primary side current via the current sensor; and (b) determining whether the transformer is under a coupling status according to the current by the controller.

Preferably, the controller includes a built-in program for manipulating the non-contact power supply, the step (a) further includes a step of (a0) initializing the non-contact power supply at a detecting mode, and the step (b) further includes the steps of: (b1) switching the power supply to a power transmission mode via the controller when the current is smaller than a first current value; and (b2) switching the power supply to the detecting mode via the controller when the current is larger than a second current value.

Preferably, the transformer further includes a secondary side, the primary side and the secondary side are close to each other within a coupling distance when the power supply is under a coupling status, and the primary side and the secondary side are separate from each other more than a predetermined value when the power supply is under a separate status.

Preferably, the non-contact power supply further includes a first rectifying apparatus coupled to an external AC power source in parallel and outputting a first DC voltage, a switch module coupled to the first rectifying apparatus, the primary side and the controller, receiving the first DC voltage and a switching signal generated by the controller and outputting a first AC voltage to the primary side, wherein the switch module driven by the switching signal works under a first switching frequency and generates a high level of the first AC voltage when the non-contact power supply is under the power transmission mode, and the switch module driven by the switching signal works under a second switching frequency and generates a low level of the first AC voltage when the non-contact power supply is under the detecting mode, a second rectifying apparatus coupled to the secondary side, receiving a second AC voltage and generating a second DC voltage and a load coupled to the second rectifying apparatus and receiving the second DC voltage.

Preferably, the switch module working under the first switching frequency makes the switching signal be a low frequency switching signal, and the switch module working under the second switching frequency makes the switching signal be one of a high frequency switching signal and a high frequency intermittent switching signal.

Preferably, the non-contact power supply further includes a first and a second capacitors, the switch module includes a first and a second output terminals, the primary side has a first and a second terminals, the first capacitor is coupled to the first output terminal of the switch module and the first terminal of the primary side in series, the second capacitor is coupled to the secondary side in parallel, and the second output terminal of the switch module is coupled to the second terminal of the primary side.

Preferably, the non-contact power supply further includes a first capacitor, the switch module includes a first and a second output terminals, the primary side has a first and a second terminals, the first capacitor is coupled to the first output terminal of the switch module and the first terminal of the primary side in series, and the second output terminal of the switch module is coupled to the second terminal of the primary side.

Preferably, the coupling detection method further includes a step of: (c) repeatedly executing the step (a) to the step (b).

According to the fourth aspect of the present invention, a coupling detection method for a non-contact power supply, wherein the non-contact power supply includes a detachable transformer having a primary side and a secondary side, a current sensor and a controller, includes the steps of: (a) initializing the power supply at a detecting mode; (b) sensing a primary side current via the current sensor; and (c) determining whether the primary side and the secondary side are coupled according to the current by the controller.

Preferably, the controller includes a built-in program for manipulating the non-contact power supply, and the step (c) further includes the steps of: (c1) switching the power supply to a power transmission mode via the controller when the current is smaller than a first current value causing the transformer under a coupling status; and (c2) switching the power supply to the detecting mode via the controller when the current is larger than a second current value causing the transformer under a separate status.

Preferably, the coupling detection method further includes a step of: (d) repeatedly executing the step (b) to the step (c).

The present invention may best be understood through the following descriptions with reference to the accompanying drawings, in which:

DETAILED DESCRIPTION OF THE PREFERRED EMBODIMENT

Figure 1:
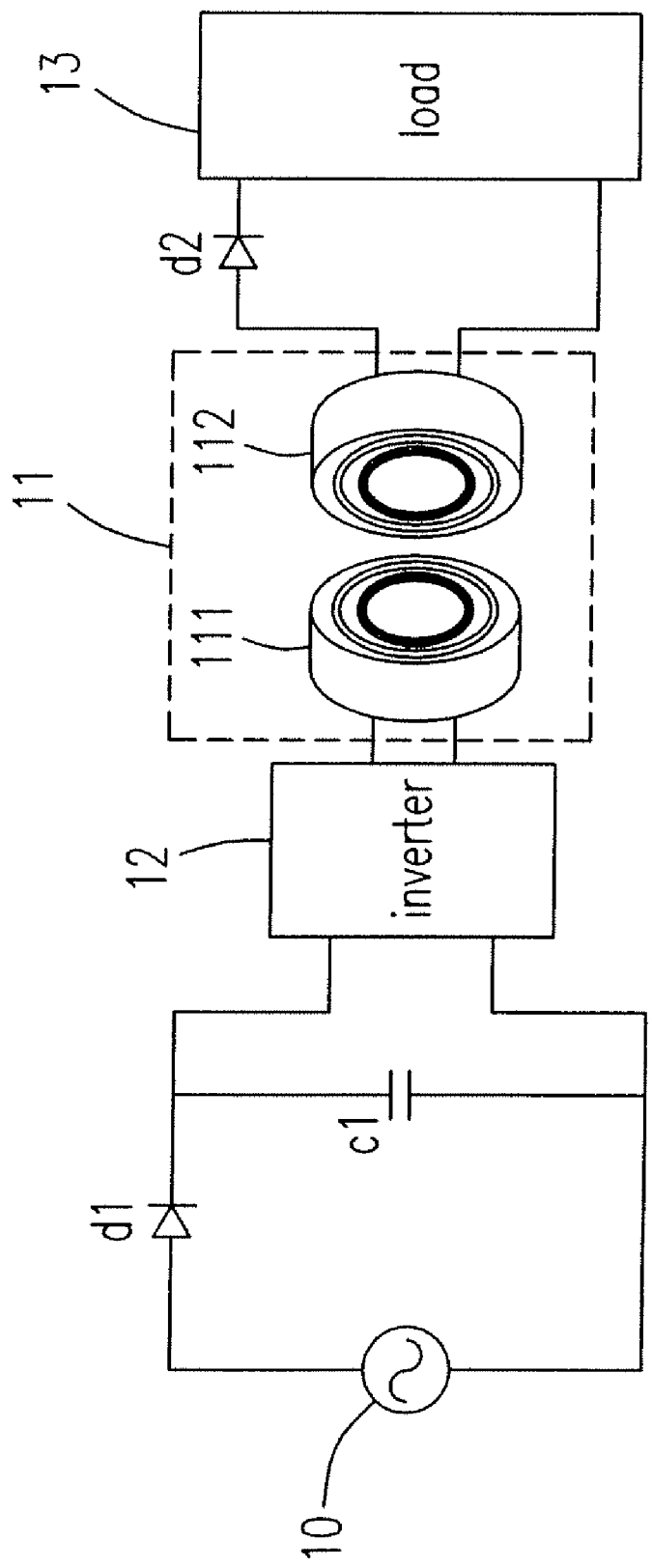
FIG. 1 shows a schematic circuit diagram of a non-contact power supply in the prior art.
Figure 2:
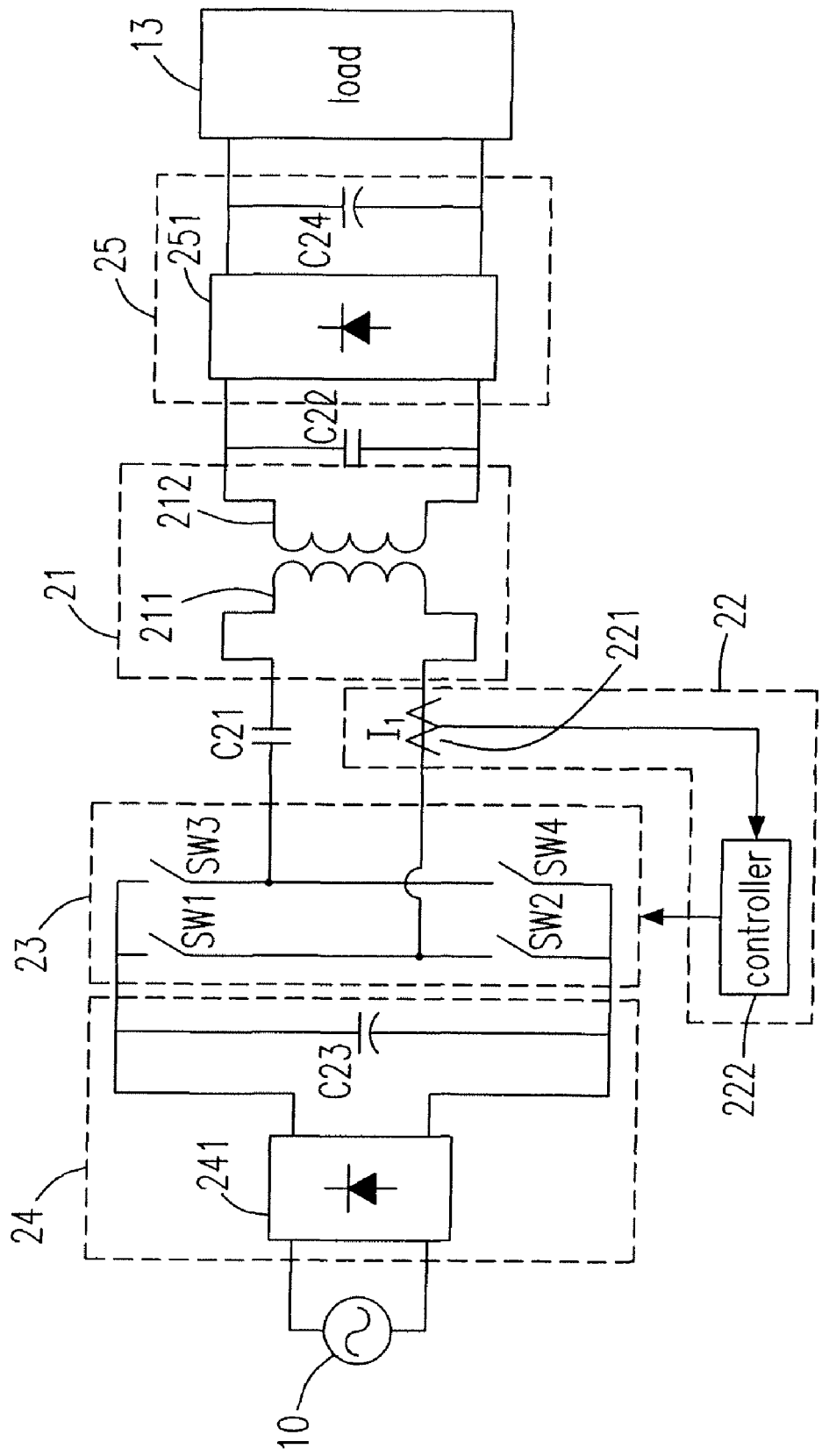
FIG. 2 shows a schematic circuit diagram of a non-contact power supply according to the first preferred embodiment of the present invention.

FIG. 2 shows a schematic circuit diagram of a non-contact power supply according to the first preferred embodiment of the present invention. In which, the non-contact power supply 2 of the present invention includes the AC power source 10, a first rectifying apparatus 24 including a first diode apparatus 241 and a third capacitor C23, a switch module 23 including a first switch SW1, a second switch SW2, a third switch SW3 and a fourth switch SW4, each of which having a first, a second and a control terminals, a built-in coupling detection device 22 including a current sensor 221 and a controller 222, a detachable transformer 21 including a primary side 211 having a first and a second terminals and a secondary side 212, a second rectifying apparatus 25 including a second diode apparatus 251 and a fourth capacitor C24, the load 13, a first capacitor C21 and a second capacitor C22. The first capacitor C21 is coupled to the first terminal of the primary side 211 and the second terminal of the third switch in series, and the second capacitor C22 is coupled to the secondary side 212 in parallel. One with an ordinary skill in the field would know that the second capacitor C22 could be omitted in a different preferred embodiment when it is necessary.

Figure 3:
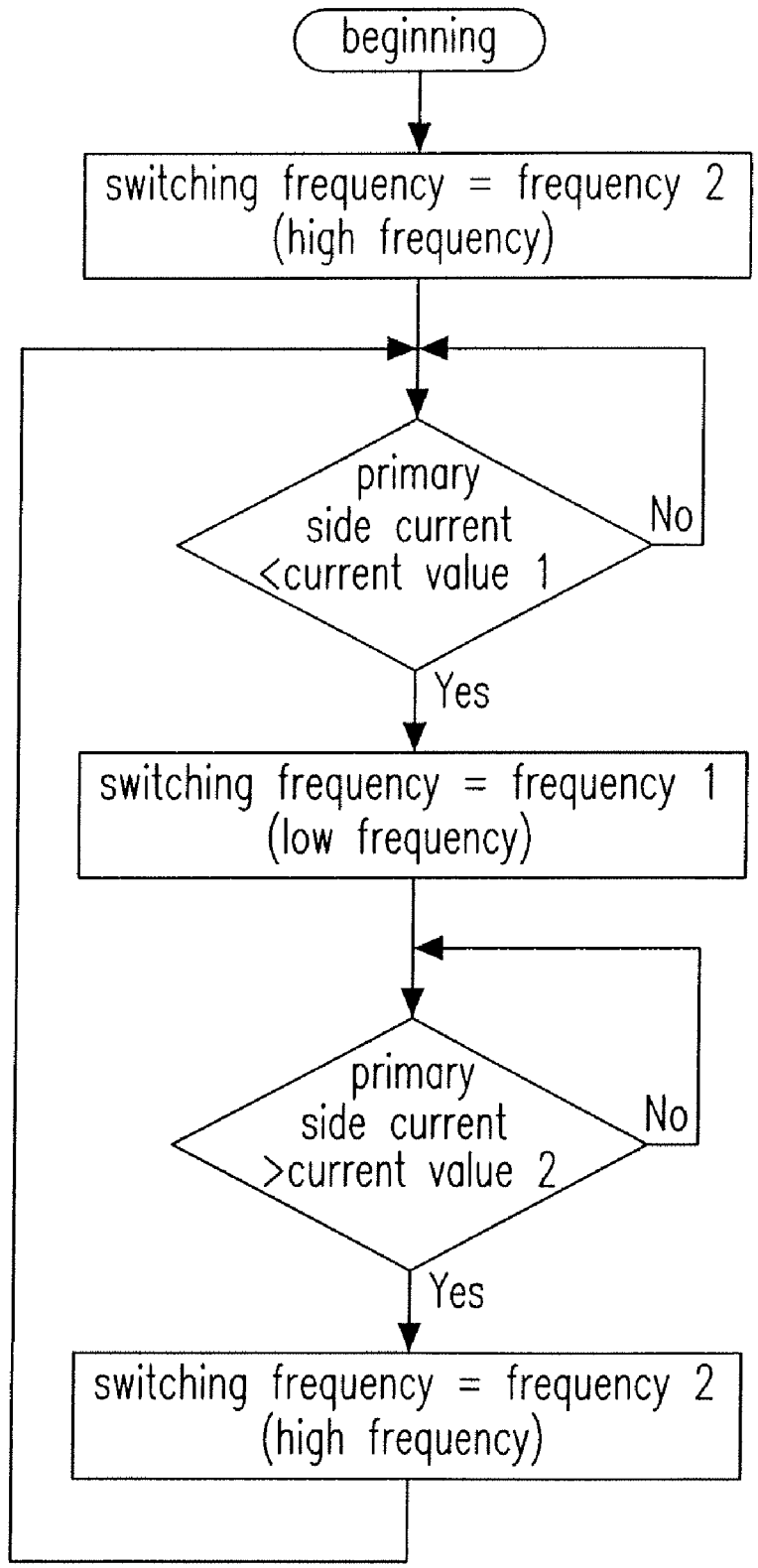
FIG. 3 shows a flow chart of the built-in program of the controller according to the first preferred embodiment of the present invention.
Figure 4:
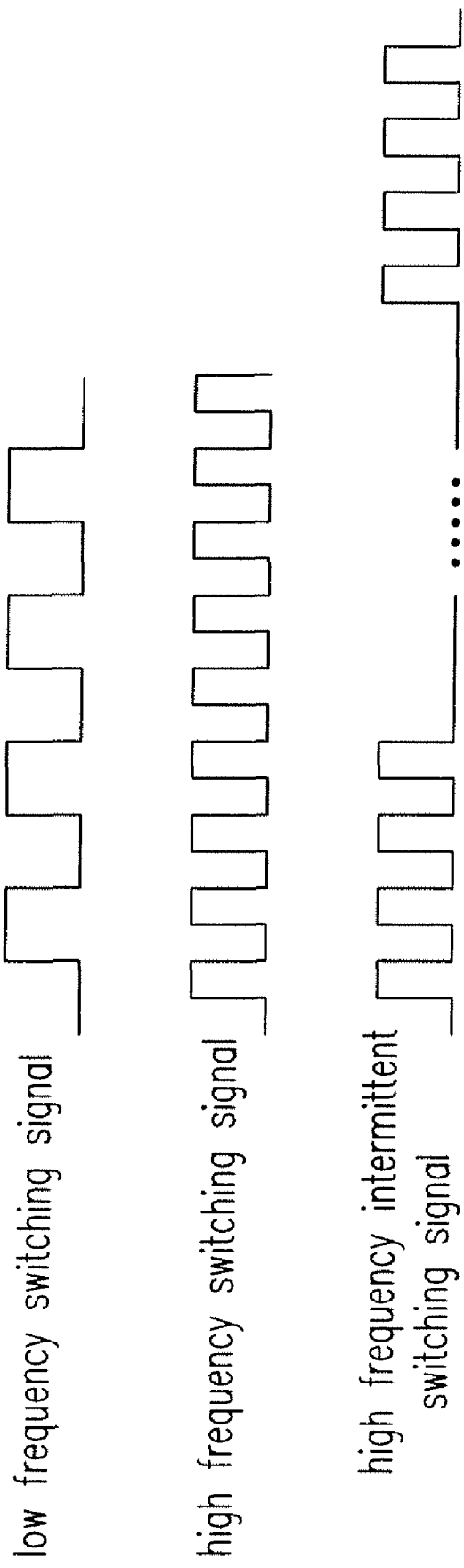
FIG. 4 shows a waveform diagram of the low frequency, the high frequency and the high frequency intermittent switching signals according to the first preferred embodiment of the present invention respectively.

The procedures of the coupling detection method for a non-contact power supply proposed in the present invention are described as follows. At an initialized status, the program inside the controller 222 is set at a detecting mode, the controller 222 outputs a switching frequency at a high frequency (frequency 2) to drive the switches SW1 to SW4 of the switch module 23, the primary side 211 and the secondary side 212 are reaching a certain position or are coupled when a current $I_1$ at the primary side 211 of the transformer 21 has been changed to less than a predetermined current value 1, then the non-contact power supply 2 switches to a power transmission mode, the controller 222 outputs a switching frequency at a low frequency (frequency 1, i.e. the normal working frequency of the power transmission mode) to drive the switches SW1 to SW4 of the switch module 23, it can be judged that the primary side 211 and the secondary side 212 of the transformer 21 are separated when the current $I_1$ at the primary side 211 of the transformer 21 has been changed to larger than the predetermined current value 2, then the non-contact power supply 2 switches back to the detecting mode, and it goes back to the judging procedure of the detecting mode again. The controlling procedures of the aforementioned coupling detection method for the non-contact power supply proposed in the present invention could be shown via the flow chart of the built-in program of the controller 222 according to the first preferred embodiment of the present invention (as shown in FIG. 3). In the present invention, the control signal is a low frequency switching signal when the switch module 23 is working under a first switching frequency, and the control signal is one of a high frequency switching signal and a high frequency intermittent switching signal when the switch module 23 is working under a second switching frequency. In FIG. 4, it shows a waveform diagram of the low frequency, the high frequency and the high frequency intermittent switching signals according to the first preferred embodiment of the present invention respectively.

Due to that the power source end of the non-contact power supply 2 is set to work under a switching frequency of a high frequency when the movable apparatus is located outside the power supply area, the primary side current $I_1$ is smaller than that of the power transmission mode at the moment, thus the power consumption and the EMI are lower than those of the power transmission mode.

Experimental Results (1) Explanation of Motions:

a. The electronic feature variations are employed to detect whether the primary side 211 and the secondary side 212 of the transformer 21 are positioned/coupled, if they are close to each other within a first predetermined distance then transmits the power (entering the power transmission mode), and if they are separate from each other more than a second predetermined distance then stops the power transmission (entering the detecting mode).

b. It is in the detecting mode when the positioning/coupling procedure has not been accomplished, the controller 222 controls the switch module 23, make the switching frequency be 140 kHz (i.e. frequency 2), when the primary side 211 and the secondary side 212 of the transformer 21 are approaching to each other to have an air gap around 3 mm (the current $I_1$ at the primary side 211 of the transformer 21 is 2.2 A at the moment, i.e. the current value 1, and the coupling procedure is considered accomplished), the controller controls the switching frequency of the switch module to be changed to 70 kHz (namely, the frequency 1), it enters the power transmission mode at the moment.

c. When the primary side 211 and the secondary side 212 of the transformer 21 are gradually separate from each other till they have an air gap around 7 mm (the current $I_1$ at the primary side 211 of the transformer 21 is 8.1 A at the moment, i.e. the current value 2, namely the over-current protection point), the controller controls the switching frequency of the switch module to be changed to 140 kHz, it enters the detecting mode at the moment.

(2) The testing results of the primary side current of the transformer 21, namely the current $I_1$ flowing through the primary side 211 of the transformer 21: as shown in the following Table 1.

| | Gap(mm) | | | | | |
|---|---|---|---|---|---|---|
| | 0 | 2 | 4 | 10 | 14 | 20 |
| | Primary side current (A) | | | | | |
| load | Frequency 70 kHz | | | Frequency 140 kHz | | |
| 500 Ω($P_{out}$ = 180 W) | 1.70 | 4.21 | 6.66 | 2.90 | 3.03 | 3.23 |
| 300 Ω($P_{out}$ = 300 W) | 2.29 | 4.94 | 6.76 | 3.09 | 3.25 | 3.38 |

According to the aforementioned descriptions, a non-contact power supply having a built-in coupling detection device with a relatively simple configuration and a coupling detection method thereof are provided. The proposed non-contact power supply 2 does not need to add any extra detecting apparatus to detect/find out whether the positioning/coupling procedure of the primary and the secondary sides of the included detachable transformer is accomplished, only the contents of the built-in program of the controller 222 of the power supply 2 needs to be modified, a current $I_1$ flowing through the primary side 211 of the transformer 21 is employed to determine whether the positioning/coupling procedure is accomplished, thus the power supply 2 has the relatively simple configuration and no extra apparatus cost, power consumptions during the idle time could be saved, and the EMI could be decreased.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A non-contact power supply, comprising:
   a detachable transformer comprising:
      a primary side; and
      a secondary side;
   a current sensor coupled to the primary side and sensing a primary side current;
   a controller generating a switching signal, coupled to the current sensor and comprising a built-in program for manipulating the power supply and initializing the power supply at a detecting mode;
   a first rectifying apparatus coupled to an external AC power source in parallel and outputting a first DC voltage;
   a switch module coupled to the first rectifying apparatus, the primary side and the controller, receiving the first DC voltage and the switching signal and outputting a first AC voltage to the primary side; and
   a second rectifying apparatus coupled to the secondary side, receiving a second AC voltage and generating a second DC voltage,
   wherein the transformer is under a coupling status when the current is smaller than a first current value, and then the controller makes the power supply switch to a power transmission mode; the transformer is under a separate status when the current is larger than a second current value, and then the controller makes the power supply switch to the detecting mode; the switch module works under a first switching frequency to generate a high level of the first AC voltage, and the switch module works under a second switching frequency to generate a low level of the first AC voltage.

2. A power supply according to claim 1 further comprising a built-in coupling detection device having the current sensor and the controller, wherein the switch module is an inverter.

3. A power supply according to claim 1, wherein the external AC power source is a commercial power and the second switching frequency is higher than the first switching frequency.

4. A power supply according to claim 1, wherein the switching signal is a low frequency switching signal when the switch module works under the first switching frequency, and the switching signal is one of a high frequency switching signal and a high frequency intermittent switching signal when the switch module works under the second switching frequency.

5. A power supply according to claim 1, wherein the second current value is larger than the first current value.

6. A power supply according to claim 1, wherein the primary side comprises a first terminal and a second terminal, the first rectifying apparatus comprises a first output terminal and a second output terminal, and the switch module comprises:
a first power switch having a first terminal coupled to the first output terminal, a second terminal coupled to the second terminal of the primary side and a control terminal;
a second power switch having a first terminal coupled to the second terminal of the first power switch, a second terminal coupled to the second output terminal and a control terminal;
a third power switch having a first terminal coupled to the first terminal of the first power switch, a second terminal coupled to the first terminal of the primary side and a control terminal; and
a fourth power switch having a first terminal coupled to the second terminal of the third power switch, a second terminal coupled to the second terminal of the second power switch and a control terminal,
wherein the control terminals of the first to the fourth switches are all coupled to the controller for receiving the control signal.

7. A power supply according to claim 6 further comprising a first and a second capacitors, wherein the first capacitor is coupled to the first terminal of the primary side and the second terminal of the third switch in series, and the second capacitor is coupled to the secondary side in parallel.

8. A power supply according to claim 7, wherein the first rectifying apparatus further comprises a first diode apparatus having at least one first diode and coupled to the external AC power source in parallel, and a third capacitor coupled to the first diode apparatus and
a switch module coupled to an external AC power source, the primary side and the controller, and outputting a first AC voltage to the primary side,
wherein the transformer is under the coupling status when the current is smaller than a first current value, and then the controller makes the power supply switch to a power transmission mode; the transformer is under a separate status when the current is larger than a second current value, and then the controller makes the power supply switch to a detecting mode; the switch module works under a first switching frequency to generate a high level of the first AC voltage, and the switch module works under a second switching frequency to generate a low level of the first AC voltage.

9. A power supply according to claim 6 further comprising a first capacitor, wherein the first capacitor is coupled to the first terminal of the primary side and the second terminal of the third switch in series.

10. A power supply according to claim 9, wherein the first rectifying apparatus further comprises a first diode apparatus having at least one first diode and coupled to the external AC power source in parallel, and a second capacitor coupled to the first diode apparatus and the switch module in parallel, the second rectifying apparatus comprises a second diode apparatus having at least one second diode and coupled to the secondary side in parallel, and a third capacitor coupled to the second diode apparatus and a load in parallel.

11. A non-contact power supply, comprising:
a detachable transformer comprising:
a primary side;
a current sensor coupled to the primary side and sensing a primary side current;
a controller coupled to the current sensor, receiving the current and determining whether the power supply is under a coupling status according to the current; and
predetermined value when the power supply is under the separate status.

12. A power supply according to claim 11, wherein the controller comprises a built-in program for manipulating the power supply and initializing the power supply at the detecting mode.

13. A power supply according to claim 12, wherein the transformer further comprises a secondary side, the primary side and the secondary side are close to each other within a coupling distance when the power supply is under the coupling status, and the primary side and the secondary side are separate from each other more than a the switch module in parallel, the second rectifying apparatus comprises a second diode apparatus having at least one second diode and coupled to the secondary side in parallel, and a fourth capacitor coupled to the second diode apparatus and a load in parallel.

14. A coupling detection method for a non-contact power supply, wherein the non-contact power supply comprises a detachable transformer having a primary side, a secondary side, a current sensor, a controller, a first rectifying apparatus coupled to an external AC power source in parallel and outputting a first DC voltage, a switch module coupled to the first rectifying apparatus, the primary side and the controller, receiving the first DC voltage and a switching signal generated by the controller and outputting a first AC voltage to the primary side, wherein the switch module driven by the switching signal works under a first switching frequency and generates a high level of the first AC voltage when the non-contact power supply is under a power transmission mode, and the switch module driven by the switching signal works under a second switching frequency and generates a low level of the first AC voltage when the non-contact power supply is under a detecting mode, a second rectifying apparatus coupled to the secondary side, receiving a second AC voltage and generating a second DC voltage, and a load coupled to the second rectifying apparatus and receiving the second DC voltage, comprising the steps of:
(a) sensing a primary side current via the current sensor; and
(b) determining whether the transformer is under a coupling status according to the current by the controller.

15. A method according to claim 14 further comprising a step of: (c) repeatedly executing the step (a) to the step (b).

16. A method according to claim 14, wherein the controller comprises a built-in program for manipulating the non-contact power supply, the step (a) further comprises a step of (a0) initializing the non-contact power supply at the detecting mode, and the step (b) further comprises the steps of: (b1) switching the power supply to the power transmission mode via the controller when the current is smaller than a first current value; and (b2) switching the power supply to the detecting mode via the controller when the current is larger than a second current value.

17. A method according to claim 16, wherein the primary side and the secondary side are close to each other within a coupling distance when the power supply is under the coupling status, and the primary side and the secondary side are separate from each other more than a predetermined value when the power supply is under a separate status.

18. A method according to claim 14, wherein the non-contact power supply further comprises a first capacitor, the switch module comprises a first and a second output terminals, the primary side has a first and a second terminals, the first capacitor is coupled to the first output terminal of the switch module and the first terminal of the primary side in series, and the second output terminal of the switch module is coupled to the second terminal of the primary side.

19. A method according to claim 14, wherein the switch module working under the first switching frequency makes the switching signal be a low frequency switching signal, and the switch module working under the second switching frequency makes the switching signal be one of a high frequency switching signal and a high frequency intermittent switching signal.

20. A method according to claim 14, wherein the non-contact power supply further comprises a first and a second capacitors, the switch module comprises a first and a second output terminals, the primary side has a first and a second terminals, the first capacitor is coupled to the first output terminal of the switch module and the first terminal of the primary side in series, the second capacitor is coupled to the secondary side in parallel, and the second output terminal of the switch module is coupled to the second terminal of the primary side.

21. A coupling detection method for a non-contact power supply, wherein the non-contact power supply comprises a detachable transformer having a primary side and a secondary side, a current sensor, a controller, a first rectifying apparatus coupled to an external AC power source in parallel and outputting a first DC voltage, a switch module coupled to the first rectifying apparatus, the primary side and the controller, receiving the first DC voltage and a switching signal generated by the controller and outputting a first AC voltage to the primary side, wherein the switch module driven by the switching signal works under a first switching frequency and generates a high level of the first AC voltage when the non-contact power supply is under a power transmission mode, and the switch module driven by the switching signal works under a second switching frequency and generates a low level of the first AC voltage when the non-contact power supply is under a detecting mode, a second rectifying apparatus coupled to the secondary side, receiving a second AC voltage and generating a second DC voltage, and a load coupled to the second rectifying apparatus and receiving the second DC voltage, comprising the steps of:

(a) initializing the power supply at the detecting mode;
(b) sensing a primary side current via the current sensor; and
(c) determining whether the primary side and the secondary side are coupled according to the current by the controller.

22. A method according to claim 21, wherein the controller comprises a built-in program for manipulating the non-contact power supply, and the step (c) further comprises the steps of: (c1) switching the power supply to the power transmission mode via the controller when the current is smaller than a first current value causing the transformer under a coupling status; and (c2) switching the power supply to the detecting mode via the controller when the current is larger than a second current value causing the transformer under a separate status.

23. A method according to claim 21 further comprising a step of: (d) repeatedly executing the step (b) to the step (c).

* * * * *